United States Patent
Hodgson et al.

(10) Patent No.: US 9,217,354 B2
(45) Date of Patent: Dec. 22, 2015

(54) METHOD FOR REGULATING AN IONIZATION DEVICE IN AN EXHAUST-GAS AFTERTREATMENT APPARATUS AND MOTOR VEHICLE IN WHICH THE METHOD IS CARRIED OUT

(71) Applicant: EMITEC GESELLSCHAFT FUER EMISSIONSTECHNOLOGIE MBH, Lohmar (DE)

(72) Inventors: Jan Hodgson, Troisdorf (DE); Christian Vorsmann, Cologne (DE)

(73) Assignee: EMITEC GESELLSCHAFT FUER EMISSIONSTECHNOLOGIE MBH, Lohmar (DE)

( * ) Notice: Subject to any disclaimer, the term of this patent is extended or adjusted under 35 U.S.C. 154(b) by 0 days.

(21) Appl. No.: 14/178,501

(22) Filed: Feb. 12, 2014

(65) Prior Publication Data

US 2014/0157761 A1 Jun. 12, 2014

Related U.S. Application Data

(63) Continuation of application No. PCT/EP2012/064291, filed on Jul. 20, 2012.

(30) Foreign Application Priority Data

Aug. 12, 2011 (DE) .......................... 10 2011 110 057

(51) Int. Cl.
*F01N 3/00* (2006.01)
*F01N 9/00* (2006.01)
(Continued)

(52) U.S. Cl.
CPC .. *F01N 9/00* (2013.01); *F01N 3/01* (2013.01); *F01N 3/0892* (2013.01); *F01N 2900/0408* (2013.01); *Y02T 10/20* (2013.01); *Y02T 10/47* (2013.01)

(58) Field of Classification Search
CPC ........... F01N 3/0892; F01N 9/00; F01N 3/01; F01N 2900/0408
USPC ..................................................... 60/274, 275
See application file for complete search history.

(56) References Cited

U.S. PATENT DOCUMENTS 3,622,839 A  11/1971  Abrams et al.
4,871,515 A * 10/1989  Reichle et al. ................ 422/174
(Continued)

FOREIGN PATENT DOCUMENTS

CN  1681599 A  10/2005
CN  101720255 A  6/2010
(Continued)

OTHER PUBLICATIONS

English Translation of French Patent Application Publication No. FR 2861802 A1 (May 2005).*
(Continued)

*Primary Examiner* — Jason Shanske
(74) *Attorney, Agent, or Firm* — Laurence Greenberg; Werner Stemer; Ralph Locher

(57) ABSTRACT

A method for regulating an ionization device in an exhaust gas after-treatment device of an internal combustion engine, includes placing at least one cathode at a distance from an anode in the exhaust gas after-treatment device, applying a high voltage between the at least one cathode and the anode, predefining a first value for the high voltage, detecting a current generated by the high voltage between the at least one cathode and the anode and predefining a second value for the high voltage if the detected current exceeds a predefinable first current intensity for a predefinable number of times. A motor vehicle in which the method is carried out is also provided.

13 Claims, 5 Drawing Sheets

(51) Int. Cl.
*F01N 3/08* (2006.01)
*F01N 3/01* (2006.01)

(56) References Cited

U.S. PATENT DOCUMENTS

| | | | |
|---|---|---|---|
| 4,969,328 A * | 11/1990 | Kammel | 60/275 |
| 7,074,370 B2 * | 7/2006 | Segal et al. | 422/186.04 |
| 7,508,140 B2 | 3/2009 | Kondo | |
| 2005/0109204 A1 | 5/2005 | Coppom et al. | |
| 2006/0150810 A1 | 7/2006 | Kukla | |
| 2008/0066621 A1 | 3/2008 | Naito et al. | |
| 2009/0145108 A1 | 6/2009 | Koide et al. | |
| 2011/0047976 A1 * | 3/2011 | Tokuda et al. | 60/275 |
| 2011/0158870 A1 * | 6/2011 | Hodgson et al. | 423/210 |
| 2012/0067214 A1 | 3/2012 | Ribera Salcedo | |
| 2012/0186447 A1 * | 7/2012 | Hodgson et al. | 95/79 |

FOREIGN PATENT DOCUMENTS

| | | |
|---|---|---|
| CN | 101936202 A | 1/2011 |
| DE | 102007025416 B3 | 10/2008 |
| DE | 102010034251 A1 * | 2/2012 |
| EP | 1837067 A1 | 9/2007 |
| FR | 2861802 A1 | 5/2005 |

OTHER PUBLICATIONS

International Search Report of PCT/EP2012/064291, Dated Dec. 13, 2012.

* cited by examiner

METHOD FOR REGULATING AN IONIZATION DEVICE IN AN EXHAUST-GAS AFTERTREATMENT APPARATUS AND MOTOR VEHICLE IN WHICH THE METHOD IS CARRIED OUT

CROSS-REFERENCE TO RELATED APPLICATION

This is a continuation, under 35 U.S.C. §120, of copending International Application No. PCT/EP2012/064291, filed Jul. 20, 2012, which designated the United States; this application also claims the priority, under 35 U.S.C. §119, of German Patent Application DE 10 2011 110 057.5, filed Aug. 12, 2011; the prior applications are herewith incorporated by reference in their entirety.

BACKGROUND OF THE INVENTION

Field of the Invention

The present invention relates to a method for regulating an ionization device in an exhaust-gas aftertreatment apparatus of an internal combustion engine. The ionization device has at least one cathode and an anode disposed at a distance from one another in the exhaust-gas aftertreatment apparatus. A high voltage which is applied between the at least one cathode and the anode permits ionization of the soot particles in the exhaust gas. The invention also relates to a motor vehicle in which the method is carried out.

In motor vehicles with mobile internal combustion engines, and in particular in diesel-driven motor vehicles, the exhaust gas of the internal combustion engine generally contains soot particles, which should not be discharged into the atmosphere. That is stipulated by corresponding exhaust-gas regulations which specify limit values for the number and mass of soot particles per unit weight of exhaust gas or per unit volume of exhaust gas and sometimes also for an overall motor vehicle. Soot particles are, in particular, unburned carbons and hydrocarbons in the exhaust gas.

Numerous different concepts for eliminating soot particles from exhaust gases of mobile internal combustion engines have already been discussed. Aside from alternately closed-off wall-flow filters, open bypass flow filters, gravity-driven separators, etc., systems have also already been proposed in which the particles in the exhaust gas are electrically charged and then deposited with the aid of electrostatic attraction forces. Those systems are known in particular under the name "electrostatic filters" or "electrofilters."

In the case of "electrofilters," an agglomeration of small soot particles to form larger soot particles and/or electrical charging of soot particles are effected through the provision of an electric field and/or a plasma. Electrically charged soot particles and/or relatively large soot particles are very much easier to separate out in a filter system. Soot particle agglomerates, due to their relatively high mass inertia, are transported more inertly in an exhaust-gas flow and thus accumulate more easily at diversion points of an exhaust-gas flow. Electrically charged soot particles, due to their charge, are drawn towards surfaces on which they can accumulate and dissipate their charge. That, too, facilitates the removal of soot particles from the exhaust-gas flow during the operation of motor vehicles.

Multiple emission electrodes and collector electrodes which are positioned in the exhaust line are thus proposed, for example, for such electrofilters. In that case, for example, a central emission electrode which extends approximately centrally through the exhaust line, and a surrounding lateral surface of the exhaust line as a collector electrode, are utilized to form a capacitor. With that configuration of emission electrode and collector electrode, an electric field is generated transversely with respect to the flow direction of the exhaust gas, wherein the emission electrode may be operated for example with a high voltage which lies in the range of approximately 15 kV. In that way, it is possible in particular for corona discharges to be generated through the use of which the particles flowing with the exhaust gas through the electric field are subjected to a unipolar charge. Due to that charging, the particles travel, as a result of the electrostatic Coulomb forces, to the collector electrode.

Aside from systems in which the exhaust line is used as a collector electrode, systems are also known in which the collector electrode is for example in the form of a wire mesh. In that case, the deposition of particles on the wire mesh takes place for the purpose of bringing the particles together with further particles if appropriate, in order to thereby realize an agglomeration. The exhaust gas which flows through the mesh then entrains the relatively large particles again and conducts them to classic filter systems. It is also known for the collector electrodes to be in the form of a structure with a multiplicity of channels through which a flow can pass. The particles which are thus deposited over a relatively large area on the channel walls can react with the oxygen and/or carbon dioxide contained in the exhaust gas, and thus be converted, in a particularly effective manner.

In all of those systems, it is desirable that, in the ionization device with a cathode and an anode, as high a high voltage as possible is applied between the cathode and the anode. The higher the applied voltage is, the higher are the electrical charge of the soot particles and/or the proportion of ionized soot particles in the exhaust gas. It must, however, be noted that, above a high voltage which is dependent on the gas parameters, an arc forms. An arc is a conductive path which is generated between the cathode and the anode by ionization and through which virtually the entire current flows and from which light is emitted in the visible range of the spectrum. The arc may indeed have the effect that soot particles deposited on the electrode and on the anode are regenerated and/or detached, but the regular formation of such an arc is undesirable because it can lead to mechanical damage to the electrode and to the anode.

High currents generally flow when an arc forms, in such a way that, when using voltage sources of limited power, the high voltage applied between the cathode and the anode decreases, or breaks down entirely, as the current increases. The decrease of the high voltage can have the effect that the arc is extinguished, which generally occurs in particular in the case of a flowing exhaust gas because the charge carriers that cause the current are entrained by the flowing exhaust gas. The decrease of the voltage below a critical value furthermore has the effect that no more particles are charged. Even though the arc extinguishes itself after a certain period of time, it is desirable for the formation of an arc to be suppressed from the outset, or for an arc to be terminated as quickly as possible.

SUMMARY OF THE INVENTION

It is accordingly an object of the invention to provide a method for regulating an ionization device in an exhaust-gas aftertreatment apparatus and a motor vehicle in which the method is carried out, which overcome the hereinafore-mentioned disadvantages and at least partially solve the highlighted problems of the heretofore-known apparatuses and vehicles of this general type. In particular, it is sought to specify a method for regulating an ionization device in an exhaust-gas aftertreatment apparatus of an internal combustion engine, in which the formation of an arc in the ionization device is prevented and/or in which the arc is already extinguished in the method a relatively short time after it forms and in which as high a voltage as possible is applied to the ionization device at all times.

With the foregoing and other objects in view there is provided, in accordance with the invention, a method for regulating an ionization device in an exhaust-gas aftertreatment apparatus of an internal combustion engine, having at least one cathode and one anode, wherein the at least one cathode is disposed in the exhaust-gas aftertreatment apparatus at a distance from the anode. The method includes at least the following steps:
  applying a high voltage between the at least one cathode and the anode,
  predefining a first value for the high voltage,
  detecting a current, generated by the high voltage, between the at least one cathode and the anode, and
  predefining a second value for the high voltage if the detected current exceeds a predefinable first current intensity a predefinable number of times, in particular once.

An ionization device is thus to be understood to mean an apparatus in the exhaust line of an internal combustion engine, which apparatus can ionize, that is to say can apply a charge to, at least some of the particles in the exhaust gas. For this purpose, the ionization device includes at least one cathode and an anode which is at a distance from the cathode. When a voltage is applied between the cathode and the anode, electrons emerge from the cathode, wherein the number of electrons emerging is substantially dependent on the construction of the cathode, in particular on the radius of curvature of the cathode and the cathode material. The exhaust-gas aftertreatment apparatus preferably includes a separation apparatus disposed downstream of the ionization device, on which separation apparatus the charged particles accumulate and, if appropriate, agglomerate before being converted by a reaction with corresponding gases, in particular nitrogen dioxide ($NO_2$), and/or a temperature increase. The separation apparatus is preferably in the form of a honeycomb body through which a flow can pass and which has a multiplicity of channels.

The cathode may, for example, be formed by a wire disposed in a pipe, wherein the pipe forms the anode. Furthermore, the cathode may be in the form of an emission electrode which is disposed centrally in an exhaust line, and wherein a separation apparatus disposed downstream of the emission electrode forms the anode. It is particularly preferable for the at least one cathode to be fastened to the rear side of a honeycomb holding body which is disposed upstream of the separation apparatus. In this case, the at least one cathode may be both electrically insulated and also connected in electrically conductive fashion to the honeycomb holding body, wherein in the latter case, the high voltage is applied to the honeycomb holding body which is insulated with respect to an exhaust pipe.

The method according to the invention is used for regulating a high voltage both of an individual cathode and also of a multiplicity of cathodes that are all connected to the same voltage source. It is preferably possible for the method according to the invention to also be used in each case for regulating one cathode of a multiplicity of cathodes that are connected in each case to one voltage source.

In accordance with another mode of the invention, the high voltage between the at least one cathode and the anode is generated by using a high-voltage source, wherein the magnitude of the high voltage is proportional to a low voltage applied to an input side of the high-voltage source and is controlled by using the low voltage. The application of the high voltage is thus realized in particular by virtue of a low voltage being applied to the input side, which low voltage results in a proportional high voltage at an output side of the high-voltage source.

In accordance with a further mode of the invention, alternatively, the magnitude of the high voltage is controlled by a frequency of a control voltage applied to the high-voltage source. In this case, the high-voltage source has applied to it firstly a constant low voltage at the input side, and secondly the control voltage with a predefinable frequency. A high voltage prevails at the output side as a function of the frequency of the applied control voltage. It is the case herein in particular that the control voltage influences the frequency of an oscillator in the high-voltage source, for example through an opto-coupler.

"Predefining" should thus be understood in particular to mean that a value of the high voltage is generated by application of a low voltage or a control voltage to the input side of a high-voltage source, wherein a corresponding high voltage is expected between the anode and the cathode.

According to the invention, the current is determined for each applied high voltage. This means in particular that, at a certain predefined high voltage, the current flowing between the cathode and the anode is detected continuously. The current may preferably be detected by using a current measuring unit which is connected in series with the anode and/or cathode and the voltage source, by using a current measuring unit connected in series with the low voltage on the input side, and/or by using an inductive current measurement at a corresponding location. In the case of a current measurement on the low-voltage side of the voltage source, it is not imperative for the current between the cathode and the anode to be measured directly, but instead it is possible to measure a value proportional to that current.

If it is now established during the detection of the current that the current exceeds a first predefinable current intensity, the high voltage applied between the anode and the cathode is changed to a second value. The predefinable first current intensity is in particular lower than such a current intensity that would be expected to flow in the event of the formation of an arc. The predefinable first current intensity is however of such a magnitude that it can be expected that a relatively large proportion of the soot particles in the exhaust gas will be ionized. The first current intensity is preferably of such a magnitude that it can be expected that an arc will form. The first current intensity may be determined for example in experiments or is preferably known from previous executions of the method. The second value for the high voltage is in particular selected in such a way that an arc that is expected or arises after exceeding the first current intensity no longer forms.

In the event of the predefinable first current intensity being exceeded, a critical state is thus identified in which the formation of an arc between the cathode and the anode is probable or in which an arc forms. The applied high voltage is accordingly changed.

In accordance with an added mode of the invention, it is preferable for the predefinable first value for the high voltage to be increased with a predefinable high-voltage increase rate. A high-voltage increase rate means the value of the voltage increase per time interval. The high voltage is thus initially increased to such an extent that the formation of an arc is presaged or announced by virtue of the detected current exceeding the first current intensity. In this case, the second value for the high voltage may be selected so as to be only slightly lower than the high voltage at which the predefinable first current intensity was determined. The applied high voltage is thus approximated as closely as possible to the optimum value for the ionization of the soot particles. It is particularly preferable if, a few times, the high voltage is increased with a high-voltage increase rate until the first current intensity is reached and a constant high voltage is thereafter predefined which, based on the high voltages associated with the detected first current intensities, gives reason to expect a high level of ionization of the soot particles, but with no formation of an arc.

In accordance with an additional mode of the invention, the second value is preferably lower than the first value. The current flowing between the cathode and the anode due to the high voltage is thus detected continuously and, in the event of a threshold value, the predefinable first current intensity, being exceeded, the high voltage applied between the cathode and the anode is reduced. With otherwise identical conditions, this has the result that the current flowing between the cathode and the anode decreases, and the formation of an arc is suppressed.

In accordance with yet another advantageous mode of the invention, which achieves the stated object even without exceeding the predefinable first current intensity, the method also includes the following steps:

determining a current increase rate of the detected current, and predefining the second value for the high voltage if the current increase rate exceeds a predefinable current increase value.

Current increase rate means that value by which the current changes per time interval. In particular, the current increase rate is formed by calculating the difference between two current values. It is very particularly preferable for a current increase value to be calculated for a time interval of at most 0.1 ms [milliseconds], particularly preferably of at most 1 ms. The current increase value, measured in the low-voltage circuit of the high-voltage source, is preferably at least 2000 A/s [amperes per second], particularly preferably at least 5000 A/s.

The increase of the current with a relatively high current increase rate is characteristic of the formation of an arc. The current increase value may for example be determined in experiments and thus predefined from the outset, although it may also be newly determined upon the formation of an arc during operation. For this purpose, for example, after the formation of an arc, the rising flank of the detected current is analyzed and a corresponding current increase value is set. In this case, an analysis of the current increase value starts above a set current increase value. Since it is specifically the case that an arc is presaged or announced or characterized by an increase of the current intensity, it is thus possible to identify the generation of an arc and to initiate corresponding measures, in particular the reduction of the high voltage, to prevent the actual occurrence of the arc or to eliminate the arc.

In accordance with yet a further advantageous mode of the invention, the predefined first value for the high voltage assigned to the current in the event of exceeding the predefinable current increase value is a critical high voltage, and the second value for the high voltage is less than or equal to the critical high voltage. This means that, after exceeding the current increase value, the high voltage is reduced to a voltage less than or equal to that high voltage whose associated current value was used for the calculation of the current increase rate. It is thus ensured that a high voltage is applied which is less than the high voltage at which the formation of an arc was impending. The second value is preferably at least 5% to 30%, very particularly preferably 5% to 15%, less than the critical high voltage.

In accordance with yet an added particularly preferable mode of the invention, the predefined high voltage is reduced to the second value if the current exceeds the predefinable first current intensity, and/or the current increase rate exceeds the current increase value, multiple times, preferably for the third time, very particularly preferably for the fifth time. This thus means that an arc is initially formed between the cathode and the anode multiple times before the high voltage applied between the cathode and the anode, or the increase of the high voltage, is changed. As a result of the multiple instances of an arc being formed, the soot that has been deposited on the anode and cathode is burned off, and thus in particular the cathode is cleaned. Secondly, as a result of the conversion of the deposited soot particles on the anode embodied as a separator, the original throughflow cross section is restored. This should be performed in particular upon a cold start in order to clean the cathode, anode and insulation. The second value should subsequently be adapted to the then prevailing conditions such as, for example, air humidity, wear of the electrode, exhaust-gas parameters, etc.

In accordance with yet an additional advantageous mode of the invention, the second value is predefined in such a way that a current with a predefinable second current intensity flows. In particular, regulation is thus proposed wherein the high voltage is predefined in such a way that a current with a predefinable second current intensity flows, and thus a substantially constant current is maintained. In this case, the predefinable second current intensity is selected in such a way that an arc cannot be formed. Accordingly, in the event of an increase of the measured current, the predefinable high voltage is reduced, and in the event of a decrease of the detected current, the high voltage is increased.

In accordance with again another mode of the invention, the first value, the second value, the first current intensity and/or the second current intensity are preferably predefined as a function of at least one of the following parameters:

aging of the cathode,
operating point of the internal combustion engine,
exhaust-gas mass flow rate,
humidity of the exhaust gas,
temperature of the exhaust gas,
load of the internal combustion engine,
size of the particles in the exhaust gas,
particle count.

The formation of an arc is dependent on the characteristics of the exhaust gas and secondarily also on the geometry of the cathode. For example, in the case of a cathode with a relatively large bend radius, a higher voltage is thus required to emit the same number of electrons. It is preferable, with rising exhaust-gas mass flow rate, for a higher high voltage to be applied, that is to say for a higher value to be predefined for the first and/or the second value, in order to maintain the ionization characteristics of the soot particles. It is likewise advantageous for the applied high voltage to be reduced with rising humidity of the exhaust gas. The high voltage is preferably reduced with rising temperature. The high voltage is also reduced in the case of an increasing load of the internal combustion engine and/or an increase of the particle count in the exhaust gas. In this case, the high voltage is preferably reduced by 5% to 30%, particularly preferably by 5% to 15%.

This means that the first value, the second value, the first current intensity and/or the second current intensity are predefined for a first set of parameter values. Further first values, second values, first current intensities and/or second current intensities are predefined for a second set of parameter values, which is presaged or announced for example by a load change of the internal combustion engine. In this case, the values from the first set of parameter values differ from the values of the second parameter set in accordance with the dependencies specified above.

In particular, the object set in the introduction is also achieved in that the high voltage is adjusted, in order to prevent the formation of an arc, exclusively as a function of at least one of the parameters listed above. A detection of the current intensity in this case is preferably used for the purpose of regulating the current in an approximately constant manner to the second value which is dependent on the parameters. It is particularly preferable if, in this case, arcs are triggered only if they are to be generated intentionally in order to clean the electrode and/or anode or in order to recalibrate the first value and/or the second value for the high voltage by detection of the current. It is thus possible, for each exhaust-gas characteristic to be expected, for in each case one voltage to be predefined which ensures optimum ionization efficiency and at which the formation of an arc is prevented.

In accordance with again a further particularly preferred mode of the invention, the first value is predefined as a function of the second value from at least one previous operating cycle. This means that a second value that was set in a previous operating cycle, in particular as a function of at least one parameter, is used for setting purposes in a new operating cycle. It is thus intended in particular to propose a self-adapting method which learns from the empirical values of preceding operating cycles. Thus, upon every exceeding of the predefinable first current intensity and of the predefinable current increase value, not only the associated high voltage but also the parameters listed above are detected. From the registered data, it is possible, for example with the aid of correlation considerations, to determine what influence the parameters have on the high voltage that triggers the arc. Thus, for a set of parameters, the first value, the second value, the first current intensity and/or the second current intensity are recorded every time an arc forms, wherein in the event of re-occurrence of those parameters, the corresponding, if appropriate averaged high voltage is applied. Each detected data set for an arc that is formed is thus utilized for improving the ionization.

With the objects of the invention in view, there is concomitantly provided a motor vehicle which includes an internal combustion engine and an exhaust-gas aftertreatment apparatus with an ionization device which has a cathode and an anode, and includes a control device which is set up to carry out the method according to the invention.

Other features which are considered as characteristic for the invention are set forth in the appended claims.

Although the invention is illustrated and described herein as embodied in a method for regulating an ionization device in an exhaust-gas aftertreatment apparatus and a motor vehicle in which the method is carried out, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
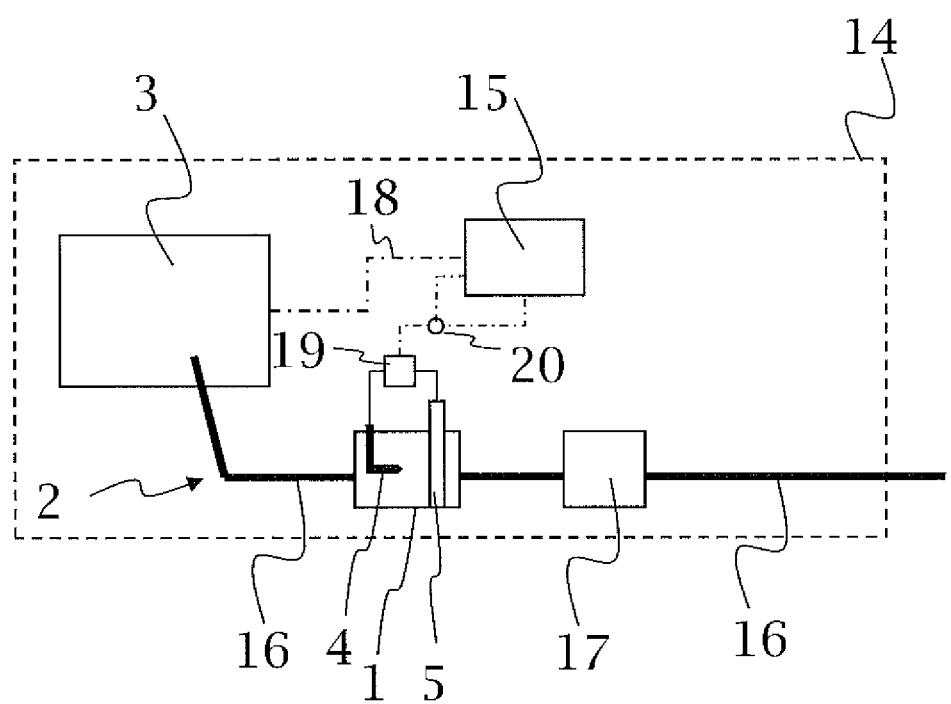
FIG. 1 is a schematic and block diagram of a motor vehicle having an exhaust-gas aftertreatment apparatus.

Referring now to the figures of the drawings in detail and first, particularly, to FIG. 1 thereof, there is seen a schematic and block diagram of a motor vehicle 14 having an internal combustion engine 3 to which an exhaust-gas aftertreatment apparatus 2 is connected. The exhaust-gas aftertreatment apparatus 2 includes an exhaust line 16 in which an ionization device 1 having a cathode 4 and an anode 5, as well as a separator 17, are disposed. A high voltage can be applied between the cathode 4 and the anode 5 by using a voltage source 19. A current that is proportional to the current flowing between the cathode 4 and the anode 5 can be measured by using a current measuring unit 20 in a low-voltage line that leads to the voltage source 19. The voltage source 19, the current measuring unit 20 and the internal combustion engine 3 are connected to a control device or controller 15 through data lines 18. The control device 15 is configured, set up and equipped to carry out the method according to the invention.

During operation, the exhaust gas exits the internal combustion engine 3 through the exhaust line 16 and enters into the ionization device 1. By virtue of a high voltage being applied between the cathode 4 and the anode 5, electrons emerge from the cathode 4 and are accelerated to the anode 5. In this case, the electrons can ionize soot particles in the exhaust gas. The exhaust gas subsequently flows through the separator 17, wherein the particles and the ionized soot particles are deposited and possibly agglomerate. The deposited soot particles are, if appropriate, regenerated by reaction with gases, in particular $NO_2$, contained in the exhaust gas and/or by a temperature increase. The control device 15 is set up in such a way that the formation of an arc between the cathode 4 and the anode 5 can be detected and suppressed, or terminated, at an early stage. For this purpose, the control device 15 evaluates the current, measured by the current measuring unit 20, in the low-voltage line to the voltage source 19. In the event of exceeding a predefinable current intensity, the high voltage applied between the cathode 4 and anode 5 is changed, in particular reduced.

Figure 2:
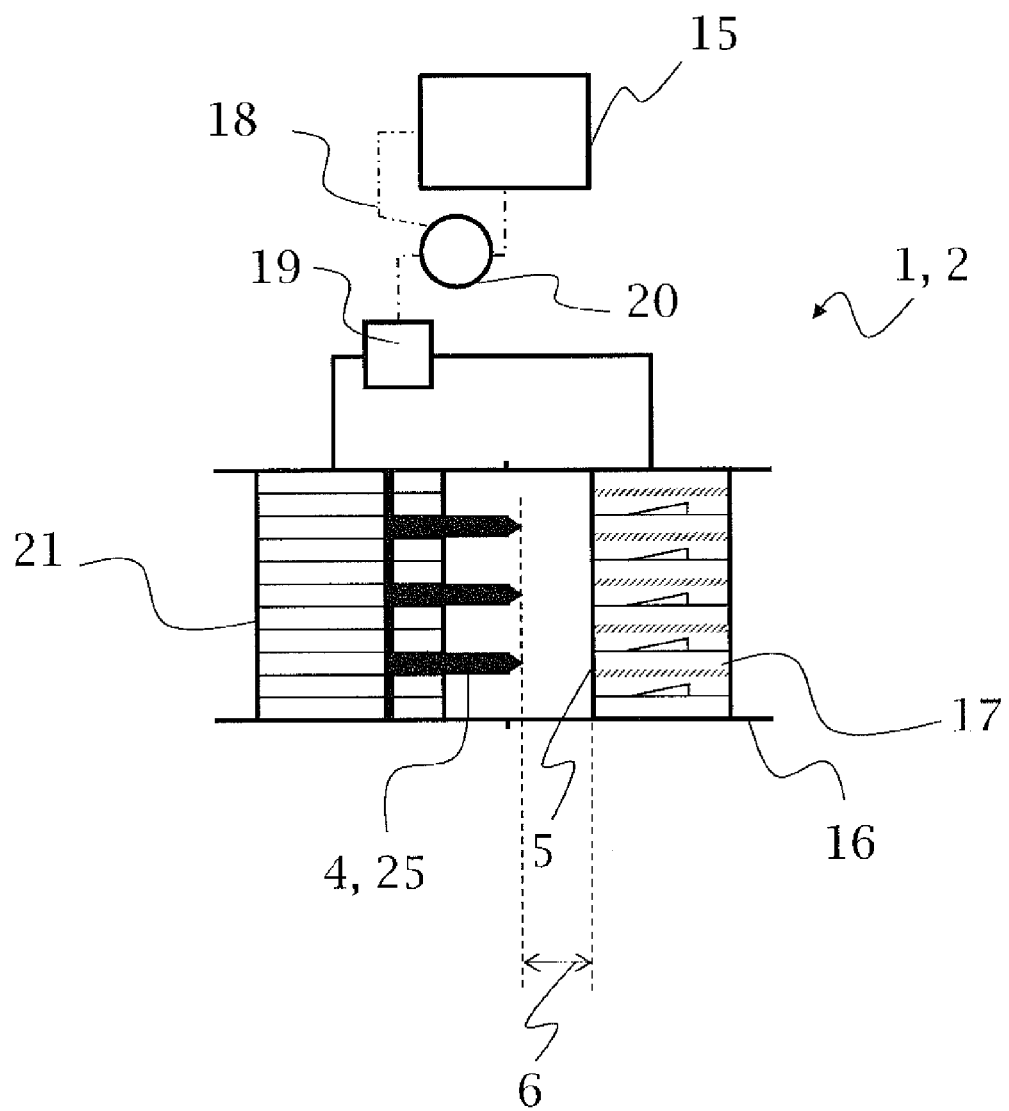
FIG. 2 is a diagrammatic, longitudinal-sectional view of an exhaust-gas aftertreatment apparatus having an ionization device.

FIG. 2 diagrammatically shows a part of an exhaust-gas aftertreatment apparatus 2. Below, a description will be given in particular of the differences compared to the embodiment illustrated in FIG. 1. In this exemplary embodiment, the cathode 4 is formed by three electrodes 25 which are fastened to an electrode holder 21. The electrode holder 21 is in the form of an electrically conductive honeycomb body, so that a high voltage can be applied to the electrode holder 21 with the high voltage simultaneously being applied to the electrodes 25. It would alternatively be possible for the electrodes 25 to be insulated with respect to the electrode holder 21 and for the high voltage to be applied directly to the electrodes 25. In this exemplary embodiment, the anode 5 is in the form of a separator 17. The electrodes 25 are at a distance 6 from an inlet surface of the separator 17 and thus from the anode 5. The electrode holder 21 is electrically insulated with respect to the exhaust line 16.

The electrode holder 21 is formed with a multiplicity of channels through which a flow can pass, in such a way that the exhaust gas is homogenized as it flows through. The soot particles in the exhaust gas are ionized in a space between the cathode 4 and the anode 5, in such a way that the probability of those soot particles being deposited in the separator 17 is increased. It is provided according to the invention that the current between the cathode 4 and the anode 5 is determined so that the applied voltage is changed if a critical current intensity is exceeded. The method will be explained in more detail by way of the statements relating to FIG. 4.

Figure 3:
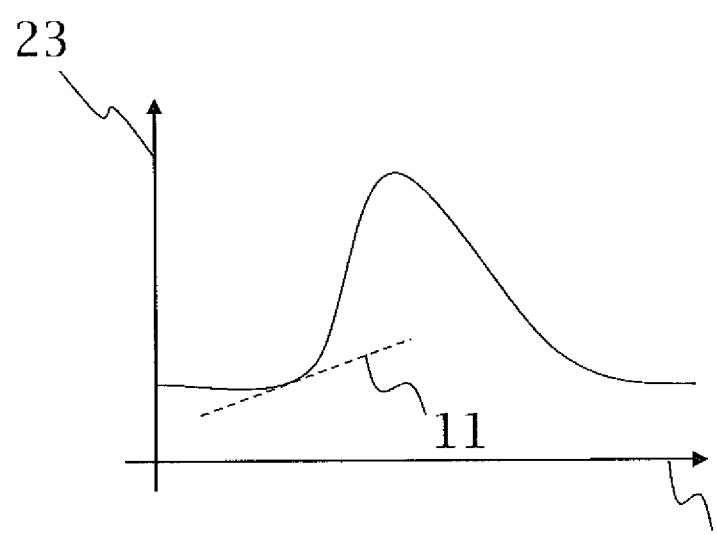
FIG. 3 is a diagram showing a profile with respect to time of a current that flows in an ionization device when exhaust gas flows.

FIG. 3 shows a profile of a current 23 with respect to time 24 in the case of an exhaust-gas flow containing soot particles passing through an ionization device 1 having a cathode 4 and an anode 5, with a constant voltage predefined by a voltage source of limited power. A virtually constant current flows for as long as the parameters of the exhaust gas do not change. In the event of an increase of the particle concentration, of the temperature of the exhaust gas and/or of the humidity of the exhaust gas, however, the current increases with a current increase rate 11. This may be attributed to the fact that molecules and/or soot particles in the exhaust gas make an increased contribution to the current flow because the probability of an ionization of the molecules and/or soot particles is higher. In the case of a cascaded ionization of the molecules and/or particles, an arc forms, in such a way that the current 23 rises quickly. Since it is however the case in a voltage source of limited power that the voltage decreases with rising current, the arc breaks down and the current 23 flowing between the anode 5 and cathode 4 falls again. The present invention seeks to prevent the formation of an arc and/or to eliminate the arc at an early stage.

Figure 4:
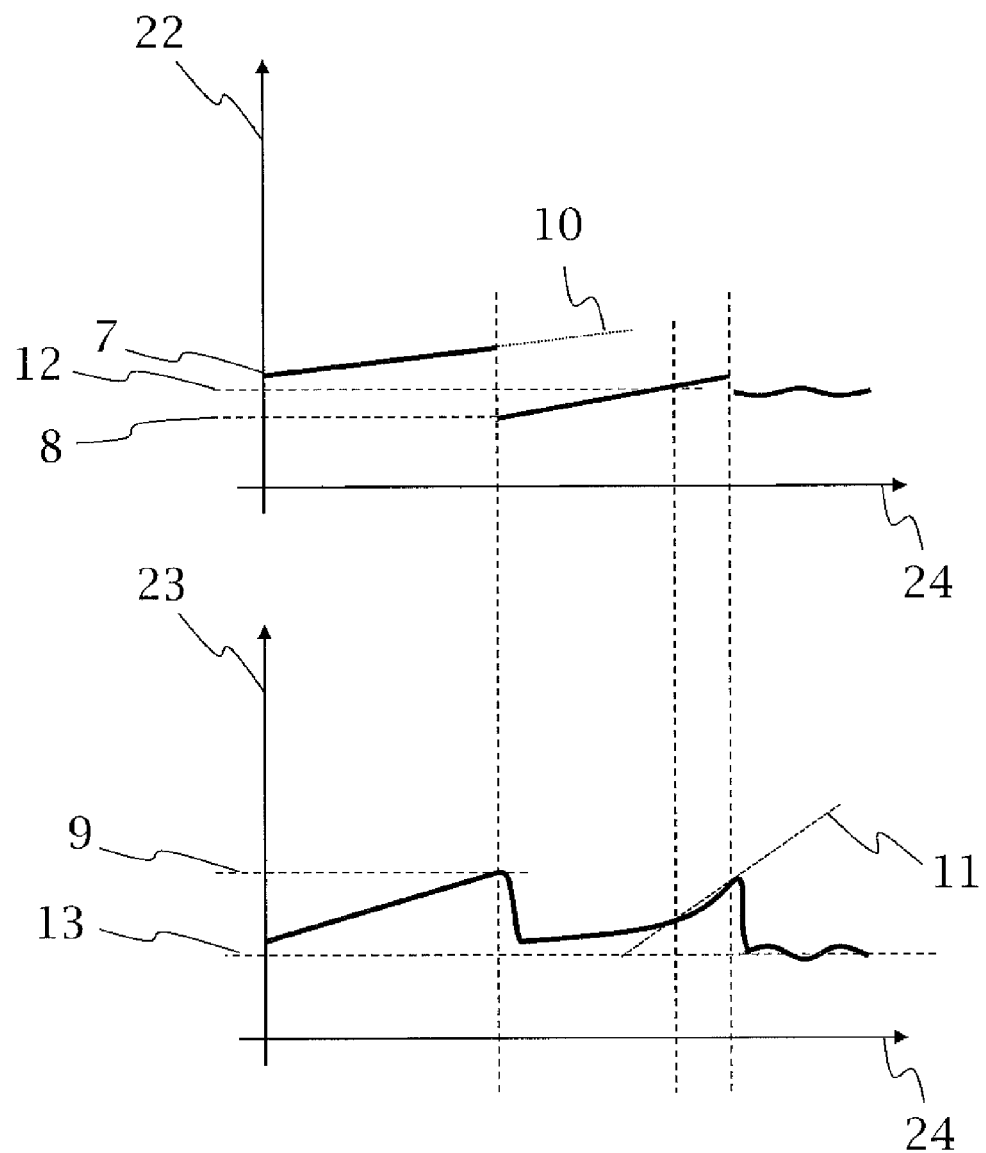
FIG. 4 includes diagrams showing a profile with respect to time of the current and the voltage during the execution of a method according to the invention.

In this regard, FIG. 4 graphically illustrates a regulating strategy. The upper illustration shows the profile with respect to time 24 of a voltage 22 predefined between the cathode 4 and the anode 5. The lower illustration shows a profile with respect to time 24 of the current 23 resulting from the voltage 22. A voltage 22 with a first value 7 is initially applied, wherein the voltage 22 is increased with a high-voltage increase rate 10. At least in the case of constant exhaust-gas conditions, the resulting current 23 rises linearly in a voltage range in which no arc forms. When a first predefinable current intensity 9 is reached, the voltage 22 is lowered to a second value 8 which, in this case, is substantially lower than the first value 7 of the voltage 22. When the high voltage with the second value 8 is applied, the current 23 also decreases.

In an alternative or additional regulating strategy which, according to the illustration in FIG. 4, follows the regulating strategy described above, the high voltage is initially increased again proceeding from the second value 8. If, due to a change in an exhaust-gas parameter, an increase of the current intensity now occurs with a current increase rate 11 which exceeds a predefinable current increase value, the high voltage is reduced. The current increase rate 11 may be formed for example by calculating the difference between two current intensities that are spaced apart in terms of time. In this case, the high voltage is reduced to the magnitude whose corresponding current intensity was utilized for determining the current increase rate 11. That voltage value in this case is designated as a critical high voltage 12. The high voltage is preferably reduced to a value lower than the critical high voltage 12.

A further regulating strategy for preventing an arc provides that, as is shown in FIG. 4 following the preceding regulating strategy, the current 23 approximately maintains a second predefinable current intensity 13. The applied high voltage is thus regulated in such a way that a current 23 flows with the second predefinable current intensity 13. Accordingly, the voltage is reduced with rising current and is increased with falling current. It is preferable for the second predefinable current intensity 13 to be a function of the exhaust-gas parameters, wherein each set of exhaust-gas parameters is assigned a second predefinable current intensity 13 in such a way that, between the cathode 4 and the anode 5, a voltage 22 is applied which causes the greatest possible number of soot particles to be ionized but at which the formation of an arc does not occur.

The high voltage at which an arc forms is highly dependent on the parameters of the exhaust-gas flow. The high voltages determined during operation at the predefinable first current intensities 9 of the predefinable current increase rate 11 are therefore also registered as a function of the exhaust-gas parameters, in such a way that a self-adapting system can be created in which it is known how, in certain situations, the high voltage is to be selected in such a way that optimum ionization of the soot particles can also take place but an arc is effectively prevented.

Figure 5:
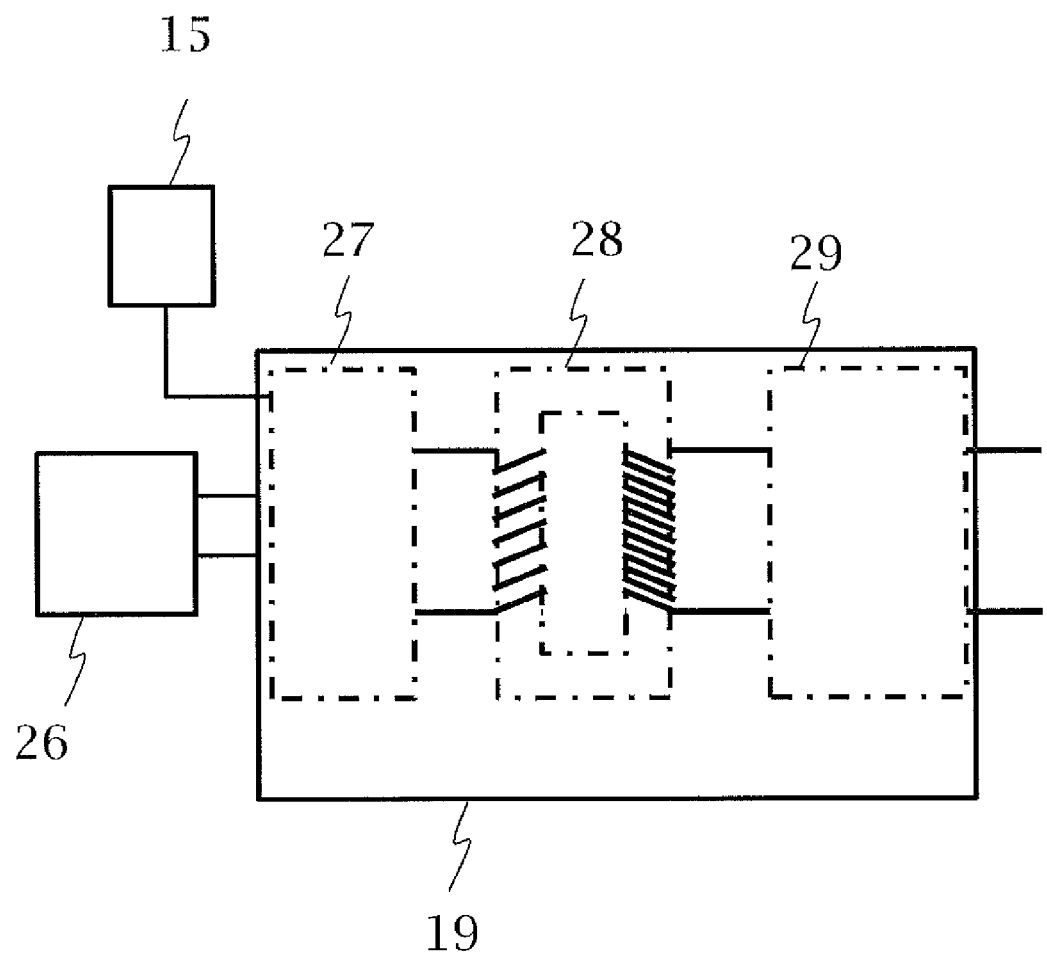
FIG. 5 is a block diagram of a voltage source for execution of the method according to the invention.

FIG. 5 diagrammatically shows a voltage source 19 such as can be used for carrying out the method according to the invention. The voltage source 19 has an oscillator 27, a transformer 28 and a high-voltage cascade 29. The voltage source 19 is connected at the input side to a control device or controller 15 and to a voltage supply 26. At the output side, the voltage source 19 is connected to an ionization device 1.

There are two possibilities for adjusting the high voltage that prevails at the output side. Firstly, the high voltage may be proportional to a low voltage (0-10 V) that is applied to the input side. Alternatively, the output voltage may be dependent on a frequency of a control signal, wherein the frequency is predefined by the control device 15.

The invention is particularly suitable for the stable and effective operation of an exhaust-gas purification device with ionization of particles in the exhaust gas.

The invention claimed is:

1. A method for regulating an ionization device in an exhaust-gas aftertreatment apparatus of an internal combustion engine, the method comprising the following steps:
    providing at least one cathode at a distance from an anode in the exhaust-gas aftertreatment apparatus;
    applying a high voltage between the at least one cathode and the anode;
    predefining a first value for the high voltage;
    detecting a current, generated by the high voltage, between the at least one cathode and the anode; and
    predefining a second value, being lower than the predefinable first value, for the high voltage if the detected current exceeds a predefinable first current intensity for a predefinable number of times.

2. The method according to claim 1, which further comprises increasing the predefinable first value for the high voltage with a predefinable high-voltage increase rate.

3. The method according to claim 1, which further comprises the following steps:
    determining a current increase rate of the detected current; and predefining the second value for the high voltage if the current increase rate exceeds a predefinable current increase value.

4. The method according to claim 3, wherein the predefinable first value for the high voltage assigned to the current in the event of exceeding the predefinable current increase value is a critical high voltage, and the predefinable second value for the high voltage is less than or equal to the critical high voltage.

5. The method according to claim 1, which further comprises reducing the predefined high voltage to the predefinable second value if at least one of the following takes place:
 the current exceeds the predefinable first current intensity or
 a current increase rate exceeds a current increase value, multiple times.

6. The method according to claim 1, which further comprises predefining the second value in such a way that a current with a predefinable second current intensity flows.

7. The method according to claim 1, which further comprises predefining at least one of the first value or the second value as a function of at least one of the following parameters:
 aging of the cathode,
 operating point of the internal combustion engine,
 exhaust-gas mass flow rate,
 exhaust gas humidity,
 exhaust gas temperature,
 load of the internal combustion engine, or
 size of particles in the exhaust gas.

8. The method according to claim 1, which further comprises predefining the first value as a function of the second value from at least one previous operating cycle.

9. The method according to claim 1, which further comprises generating the high voltage between the at least one cathode and the anode using a high-voltage source, adjusting a magnitude of the high voltage to be proportional to a low voltage applied to an input side of the high-voltage source and controlling the magnitude of the high voltage by using the low voltage.

10. The method according to claim 1, which further comprises generating the high voltage between the at least one cathode and the anode by using a high-voltage source, and controlling a magnitude of the high voltage by using a frequency of a control voltage applied to the high-voltage source.

11. The method according to claim 1, which further comprises applying as high a voltage as possible to the ionization device at all times and at least one of preventing formation of an arc or extinguishing an already formed arc in the ionization device.

12. A motor vehicle, comprising:
 an internal combustion engine;
 an exhaust-gas aftertreatment apparatus having an ionization device with a cathode and an anode disposed at a distance from each other; and
 a controller configured to regulate said ionization device by:
  applying a high voltage between said cathode and said anode;
  predefining a first value for the high voltage;
  detecting a current, generated by the high voltage, between said cathode and said anode; and
  predefining a second value, being lower than the predefinable first value, for the high voltage if the detected current exceeds a predefinable first current intensity for a predefinable number of times.

13. The motor vehicle according to claim 12, wherein said controller regulates said ionization device by applying as high a voltage as possible to said ionization device at all times and at least one of prevents formation of an arc or extinguishes an already formed arc in said ionization device.

* * * * *